United States Patent [19]

Elder et al.

[11] 4,068,997
[45] Jan. 17, 1978

[54] CUTTING MEANS FOR BOOK BINDING MACHINE

[75] Inventors: George E. Elder, San Jose; Clark A. Van Horne, Santa Clara; George C. Wu, San Jose, all of Calif.

[73] Assignee: Velo-Bind, Inc., Sunnyvale, Calif.

[21] Appl. No.: 692,200

[22] Filed: June 2, 1976

Related U.S. Application Data

[62] Division of Ser. No. 625,949, Oct. 28, 1975, Pat. No. 3,994,055.

[51] Int. Cl.² ............................................. B29C 17/08
[52] U.S. Cl. ................................. 425/305.1; 83/171; 425/174
[58] Field of Search ....................... 83/171, 246, 549; 425/302 R, 305 R, 174

[56] References Cited

U.S. PATENT DOCUMENTS

| | | | |
|---|---|---|---|
| 2,216,603 | 10/1940 | Schwimmer | 83/171 |
| 3,177,748 | 4/1965 | Rosenthal | 83/171 |
| 3,352,011 | 11/1967 | Alexander et al. | 83/171 X |
| 3,407,105 | 10/1968 | Staats et al. | 11/1 AC X |
| 3,452,376 | 7/1969 | Ito | 11/1 R |
| 3,877,625 | 4/1975 | Brock | 83/171 X |
| 3,879,783 | 4/1975 | Guilie | 11/1 R |

Primary Examiner—Robert L. Spicer, Jr.
Attorney, Agent, or Firm—Julian Caplan

[57] ABSTRACT

Apparatus for use with a pair of thermoplastic strips of the type illustrated in U.S. Pat. No. 3,608,177 wherein one strip is formed with studs longitudinally spaced at intervals and a second strip apertured and counterbored at the same intervals is used to bind sheets apertured at the same intervals at locations spaced inward from one marginal edge is described. A pressure bar is first manually moved to operative position and a handle compresses the strips together by exerting a controlled force on the pressure bar. The handle then initiates movement of a support for a knife consisting of a length of metallic ribbon material having spaced horizontal stretches in horizontal alignment with excess stud lengths of the first strip projecting through the second strip, the ribbon being under tension to hold such stretches taut. As the support moves toward the studs a current is passed through the ribbon, heating it so that the ribbon functions to cut off the excess stud length slightly below the second strip. The current then is terminated as the support moves upward forming heads on the stud stubs filling the counterbores in the second strip. By this time, the ribbon has cooled and functions to cool and harden the heads. Retraction of the handle returns the support to initial position and releases the pressure bar. The handle also actuates a punch for the apertures in the sheets, the punch being located at a different station in the machine from the binding mechanisms.

6 Claims, 27 Drawing Figures

CUTTING MEANS FOR BOOK BINDING MACHINE

This is a division of application Ser. No. 625,949, filed Oct. 28, 1975, now U.S. Pat. No. 3,994,055.

This application relates to an improvement in binding machines such as those shown in U.S. Pat. Nos. 3,756,625 and 3,811,146. The improvement consists in the provision of a relatively inexpensive, manually operable machine to compress binding strips with a predetermined pressure with apertured paper between the strips, the studs on one strip fitting through holes in the sheets of paper and through the apertured second plastic strip. The machine also has capability of being used as a punch to form the apertures in the sheets of paper. The thermo-plastic material strips used in connection with this invention are adequately described in the aforementioned patents, as is the book which is produced. The invention of the present application relates to a number of improvements in the apparatus previously patented.

One improvement relates to the electrically heated cutoff mechanism which cuts off the excess lengths of the plastic studs of the first plastic strip, then forms heads on the stubs of the cut off ends and cools and forms these heads to fill counter-bores in the second plastic strip. The cut off device is a transversely extending piece of metallic ribbon bent in a shape hereinafter described in detail and heated by passing an electric current through opposite ends of the ribbon. Certain portions of the ribbon are tensioned and held horizontally between supports, and these horizontal portions are brought to bear against the plastic studs to cut and form the same. Preferably, the ribbon is a single length of spring steel bent in straight stretches corresponding in number and position to the studs with angular stretches between the straight stretches tensioned by spring clips. Preferably, the ribbon is coated with a Teflon coating to overcome tendency of the thermo-plastic stud material to stick thereto. Passage of current between opposite ends of the ribbon heats the latter rapidly by resistance. After the current is cut off, the ribbon cools rapidly. A mechanism is provided whereby a support is moved horizontally rearwardly to cut the studs, the support is then moved upwardly to form rivet heads of the stubs of thermo-plastic stud material and meanwhile, the ribbon has cooled and thereafter functions as a heat sink to cool and harden the heads. The electrical circuitry for the ribbon knife indicates when a sufficient time has elapsed to cool the heads and signals the operator to release the pressure from the plastic strips to remove the completed book.

A still further feature is the fact that the knife which cuts the studs is moved by springs and is thus not fixed in a path and speed of movement. Thus variations in hardness and melting point of the thermo-plastic stud material are accommodated by the "free floating" knife.

Another improvement over prior machines is that both cutting of the studs and heading of the rivets is accomplished by the knife, which is preferably heated while cutting and cooled while heading.

A still further feature is the use of a manually activated handle which engages the pressure bar which compresses the sheets, and releases the knife support for cutting and heading. Further, the same handle punches sheets.

Another feature of the invention is a spring overload on the pressure bar assembly to prevent damage to the machine and produce constant pressure on the document being clamped regardless of thickness.

Another improvement relates to the pressure applying mechanism. It is important that a predetermined pressure be applied to the plastic strips by means of a pressure bar which engages the top of the first strip and forces it toward the second strip. The operator of the apparatus manually moves the pressure bar from a retracted position to an operative position resting lightly upon the top of the first plastic strip. Thereupon, the operator manually pulls a handle forwardly which applies additional downward force on the pressure bar until a pre-selected pressure is applied, whereupon the pressure bar is latched in position. At this point, blockage of movement of the knife supporting mechanism is released and the knife support is moved into cutting position by means of springs. Return of the operating handle to original position retracts the knife support.

Another feature of the invention is the fact that the same handle which actuates the clamping and releases the knife support mechanism also actuates a punch which is located at a location removed from the binding functions of the machine and is usable in forming holes in the sheet to be bound. It will be understood, however, that other punching means or pre-punched paper may be utilized.

A further feature of the invention is the provision of interlock systems whereby the knife support mechanism is not moved or heated when the operating handle is moved unless the pressure bar has been manually moved from retracted to operative position. This permits punching of paper without heating the knife or moving the knife.

Another feature of the invention is the fact that there is no cut off of the excess stud material until the pressure bar applies to the binding strips a predetermined compressive force.

Another feature of the invention is the provision of a punch to punch a series of holes spaced apart along a marginal edge of a stack of sheets of paper or other material. In one form of the punch hereinafter illustrated and described, the male punch elements are circular pins having enlarged heads at their upper ends. The heads are received in apertures punched in a vertically reciprocating plate. The apertures are so constructed that on the down or punching stroke of the punch the heads of the male punch elements are depressed serially rather than simultaneously and thus the force required to punch a given stack is reduced. On the upward or return stroke of the punch all of the pins are raised simultaneously. Other features of the punch reside in the face that an oscillatory crank movement is transmitted to vertical reciprocation of the aforementioned plate with an economy of mechanical components.

Still another feature of a modified punch is that the punch elements are square or rectangular in cross-section to punch corresponding square or rectangular holes. These punch elements are projections from one or more plates fastened to the vertically reciprocating plate heretofore described. One of the features of this form of the invention is the fact that the punch plate and male punch elements can be stamped from a sheet of steel or other material, thereby reducing the number of parts and greatly reducing the fabrication required to make the punch.

Other features of the invention reside in the simplicity of manufacture and assembly of the machine; and accordingly, its low cost as compared with previous machines to perform the same function.

Other objects of the present invention will become apparent upon reading the following specification and referring to the accompanying drawings in which similar characters of reference represent corresponding parts in each of the several views.

Figure 1:
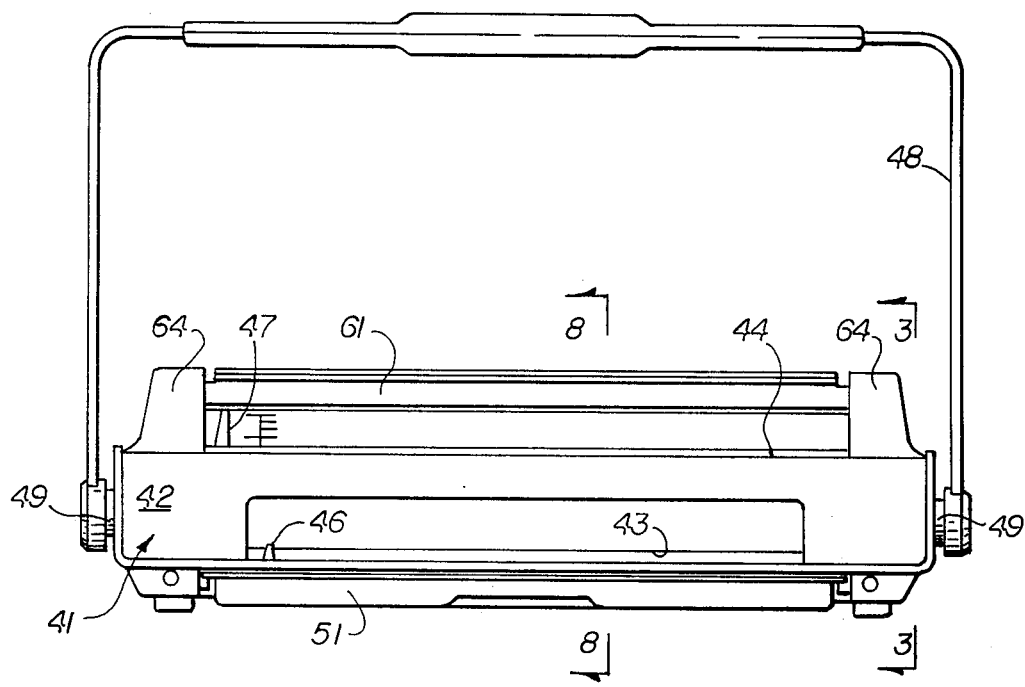
FIG. 1 is a front elevational view of a machine in accordance with the present invention.

As shown in FIGS. 15-18 and as described in greater detail in the U.S. Pat. No. 3,756,625, the apparatus hereinafter described preferably employs for its use a first thermo-plastic strip 21 which is rectangular in cross section and has spaced at 1 inch or similar intervals along its length depending from one side face thereof studs 22 formed with points 23 at their lower ends. Strip 21 as well as second strip 24 is preferably formed of a thermo-plastic material such as polyvinyl chloride. Second strip 24 is also rectangular in cross section and is of the same length as strip 21, which is preferably the length of the book to be bound. At intervals complementary to studs 22 are first apertures 26 having counterbores 27 on their lower surfaces. The sheets 28 to be bound are formed with second apertures 29 adjacent one marginal edge, the spacing between apertures 29 being the same as that between the studs 22 and first apertures 26. Operation of the apparatus, hereinafter described, applies a downward pressure on the top of first strip 21, the studs 22 of which have been inserted through the apertures 29 and the apertures 26 so that there are projecting portions 31 of studs 22, the extent of projection depending upon the thickness of the sheets 28. The apparatus cuts the projecting portions 31 at a level slightly below the bottom of strip 24 leaving short stubs which are melted by a knife and moved to form heads 32 filling the counterbores 27 of the second strip. After the thermo-plastic material forming the heads 32 has cooled sufficiently, the pressure against the first strip 21 is removed and a completed book has been produced. The foregoing description of the strips, sheets and method are similar to that of the operation and of the supplies used with the machines of U.S. Pat. Nos. 3,756,625 and 3,811,146, and the book completed thereby.

Figure 2:
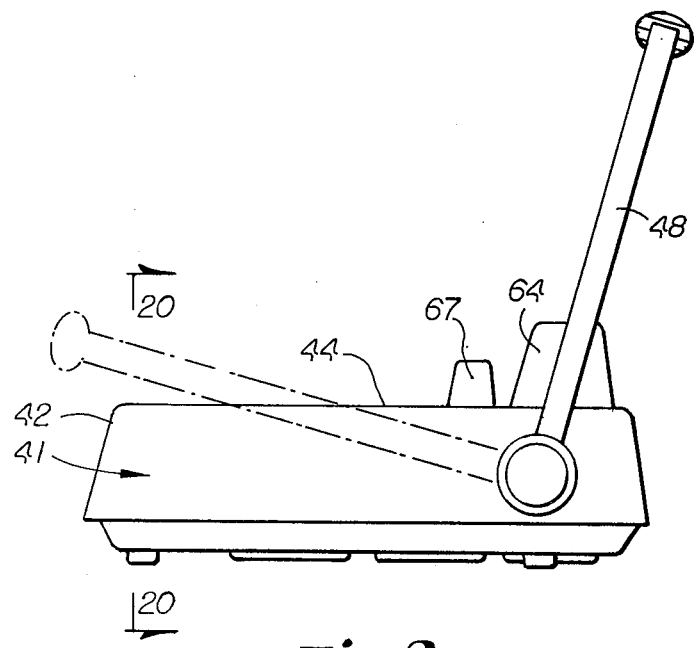
FIG. 2 is a side elevational view thereof showing the handle in retracted position in full lines and in dot-and-dash lines in full forward position.

The apparatus of the present invention has a casing 41, preferably molded of a plastic material having a front 42 formed adjacent the bottom with a punching opening 43 into which papers are inserted for punching of apertures therein. The casing 41 has a top 44 which also functions as a platen, as hereinafter explained. There is a punch edge guide 46 adjacent to the punch opening 43 and a binding edge guide 47 on the top 44 which are adjustably positioned to be engaged by one side edge of the sheets to be punched or bound respectively. An inverted U-shaped handle 48 has spindles 49 which extend through the sides of casing 41 adjacent the rear thereof. The handle is pulled manually from the solid line retracted position of FIG. 2 to the dot-and-dash line forward position which indicates the end of either the punching or the binding position of the handle 48. A drawer 51 for scrap paper punched from the sheets by the punching function or severed ends of the plastic studs cut during the binding portion is provided. Said drawer 51 is slid forwardly for dumping of the debris when it has accummulated.

Figure 8:
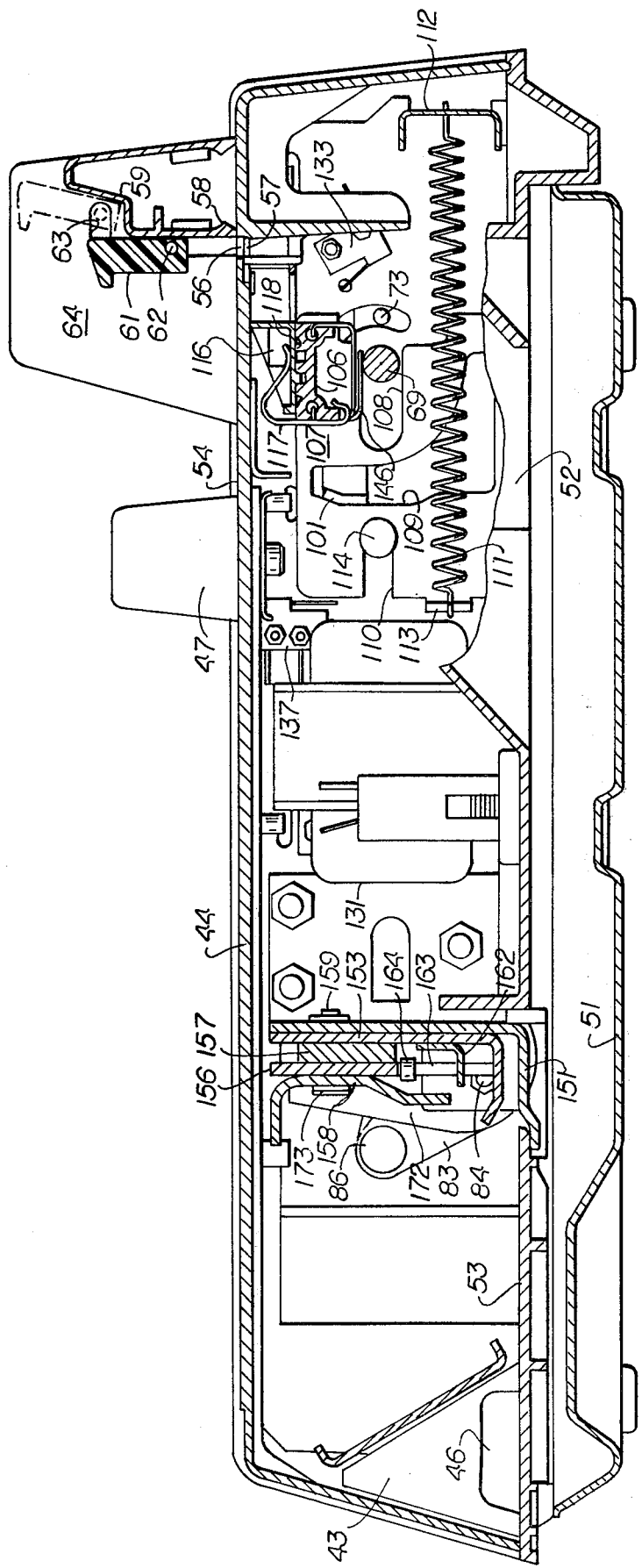
FIG. 8 is a sectional view taken substantially along the line 8—8 of FIG. 1.

Extending along either side of the machine inside the sides of casing 41 are vertical side plates 52 suitably spaced apart and rigidly attached by mounting means 55. Extending between the side plates 52 are horizontal punch platen 53 on the lower and forward end of the machine and binding platen 54 on the top and rear of the machine. Binding platen 54 is formed with a transversely extending shallow recess 56 to receive second strip 24 and there is an opening 57 below recess 56 through which project the portions 31 of studs 22 below strip 24. As best shown in FIG. 8, there is a transverse substantially vertical rear edge stop 58 for the rear edge of the sheets supported on platen 54 which squares said edges with the rear edge of strip 24 when the latter is in recess 56. Stop 58 is flexibly supported by support 59. Certain of the strips 21, 24 may be wider than the others for certain types of binding functions, and to accommodate such strips the stop 58 may move rearward when the wider strips are inserted in the recess 56. Support 59 is attached to side posts 64 which extend up above the level of top 44 adjacent the rear of each side of the machine. Extending between the posts 64 is a transverse pressure bar 61 which applies downward pressure to first strip 21. At each end of pressure bar 61 are pins 62, the upper pin 62 fitting into a horizontal slot in the inward facing surfaces of post 64 and then being movable into an elongated vertical slot 66 in the inward faces of side posts 64. When the upper pin 62 is in horizontal slot 63 and pushed rearwardly thereof, the pressure bar 61 is retracted from its operative position and is tilted upwardly-rearwardly out of the way of the insertion of the sheets 28 and first strip 21. When the bar 61 is moved manually forwardly and downwardly, the pins 62 slide in vertical slots 66. Upper pin 62 is pivotally connected to link 67 which extends below top 44 and lies immediately outside plate 52. The lower end of link 67 is pivotally connected by means of pin 70 to crank arm 68, the opposite end of which turns the noncircular portion of transverse horizontal shaft 69. Also turning with shaft 69 is a piece carrying a ratchet segment 71. Plate 52 is formed with an arcuate slot 72 concentric with shaft 69 and pin 73 in crank arm 68 oscillates in slot 72.

Figure 3:
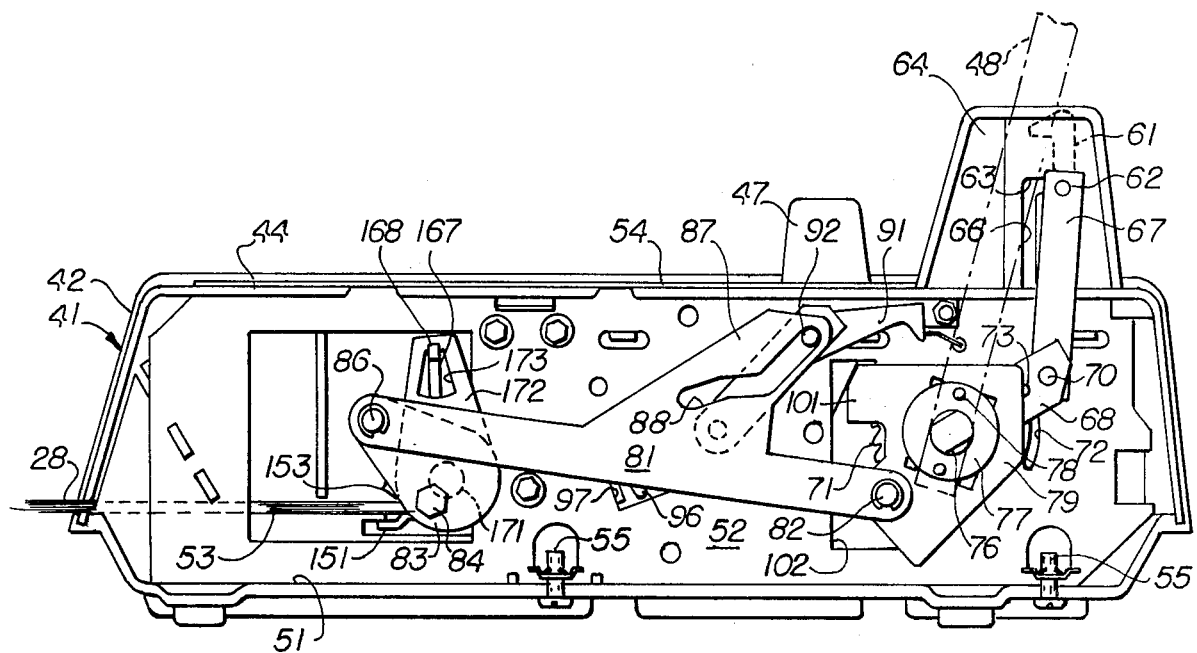
FIG. 3 is a side elevational view with the side of the housing of the machine removed taken substantially along line 3—3 of FIG. 1 showing the handle in retracted position.
Figure 4A:
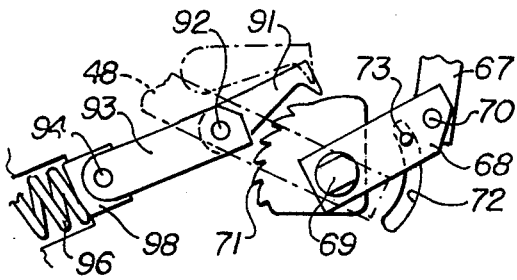
FIG. 4A is a fragmentary view of a portion of the mechanism behind that shown in FIG. 4.
Figure 4:
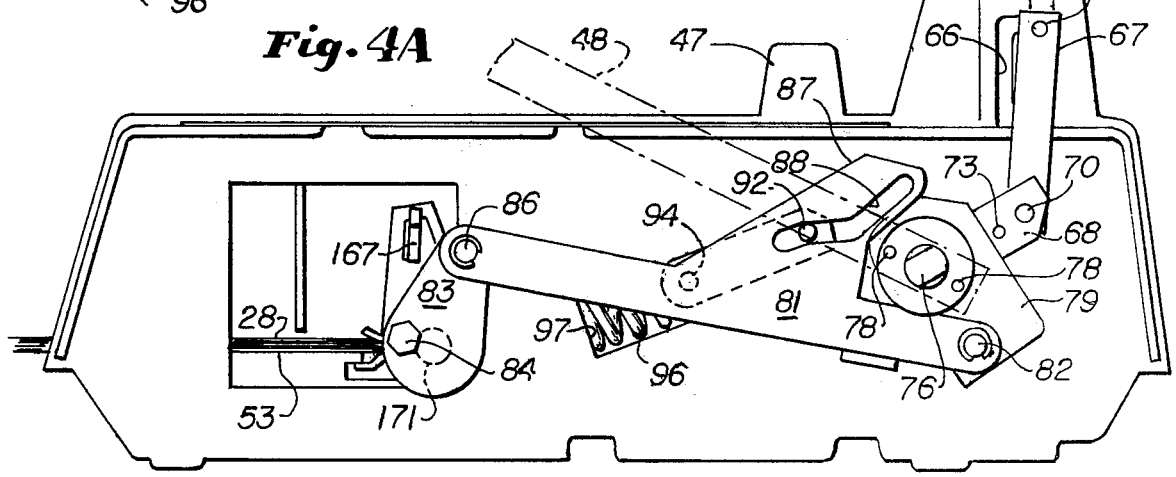
FIG. 4 is a view similar to FIG. 3 with certain parts removed for simplicity of illustration showing the handle in full forward position and completion of performance of the punch function.
Figure 5:
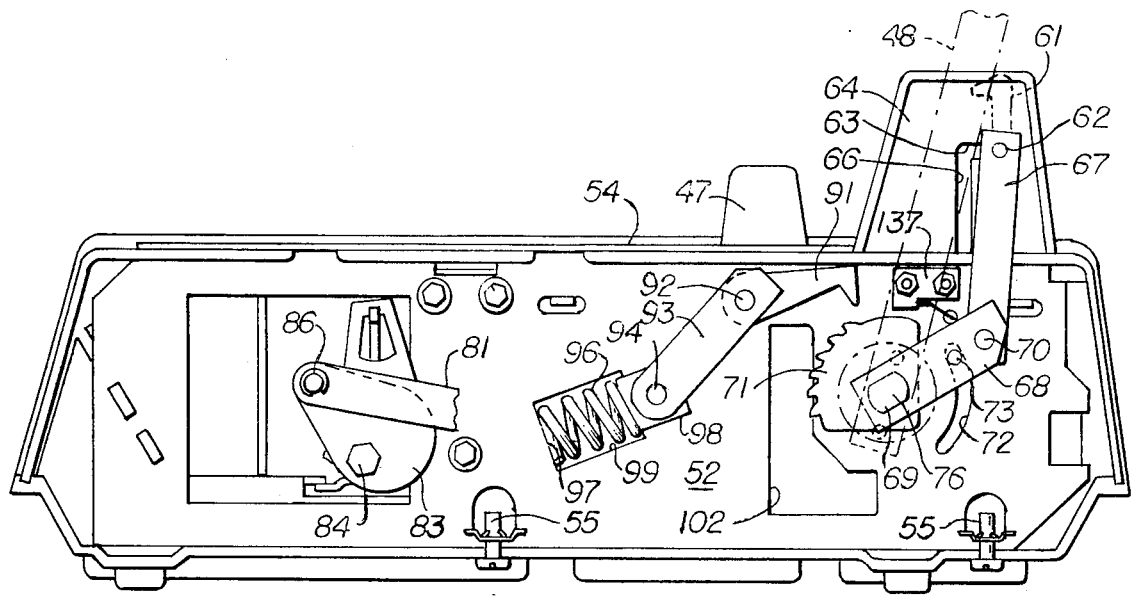
FIG. 5 is a view similar to FIG. 3 with certain additional parts removed to reveal underlying structure showing the structure prior to commencement of the binding function.
Figure 6:
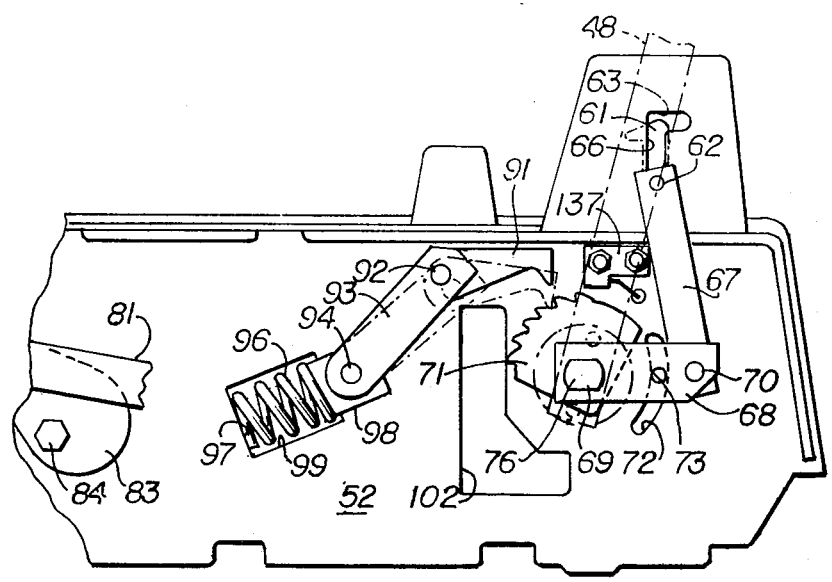
FIG. 6 is a fragmentary view of a portion of the structure of FIG. 5 showing the pressure bar manually placed in position for commencement of the binding function.
Figure 7:
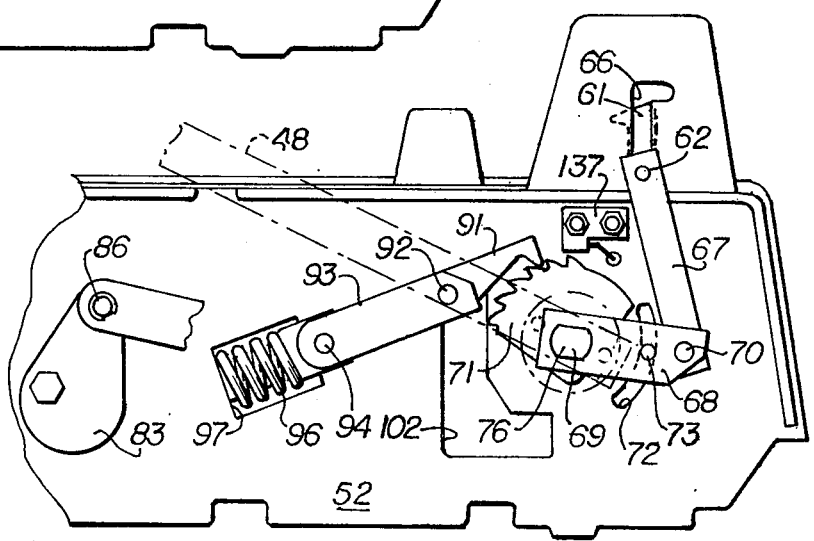
FIG. 7 is a view of a portion of the structure of FIG. 6 showing completion of the compression of the binding strips.

Directing attention now to FIG. 3, in a position outside of the path of movement of crank arm 68 is a shaft extension 76 and surrounding the same and oscillatable relative thereto is a bushing 77 which receives connecting pins 78 attached to the handle 48 so that the bushing 77 oscillates about the center of shaft extension 76 as the handle 48 is moved from its retracted to full forward position. Turning with bushing 77 is an irregularly shaped crank 79 which is pivotally connected at its left rear as viewed in FIG. 3 by means of pivot 82 to a longitudinally forwardly extending link 81. Adjacent the forward end of the machine is a punch crank 83 which is pivotted to plate 52 by punch pivot 84. The punch mechanism is hereinafter described; the purpose of the mention of crank 83 and pivot 84 at this point is merely to show positive location of the forward end of link 81 which is connected to crank 83 by pivot 86. Intermediate pivots 82 and 86 is an upward exxtension 87 of link 81 formed with an angularly shaped slot 88 as best shown in FIGS. 3 and 4. Directing attention now to FIG. 5, fitting within slot 88 is pin 92 relative to which pivots pawl 91 shaped to engage the ratchet segment 71. Pin 92 pivotally connects pawl 91 to a link 93, the forward-downward end of which carries a pin 94 connected to fitting 98 bearing against the upper end of compression spring 96 which is held in an aperture 99 in plate 52 by support 97. When the handle 48 is pivoted from retracted position to forward position, if the pressure bar 61 has been moved forwardly and downwardly so that the ratchet segment 71 is partially turned from the position of FIG. 5 to the position of FIG. 6, as the handle 48 moves the link 81 is moved rearwardly and downwardly from the position of FIG. 3 to the position of FIG. 4 and the pin 92 slides from its up position in slot 88 of FIG. 3 to its down position of FIG. 4 causing the pawl 91 to move from the position of FIG. 5 to the position of FIG. 7 which turns the ratchet segment 71 in a clockwise direction as viewed in FIG. 7 until the spring 96 compresses under a predetermined application of force whereupon movement of the pawl 91 terminates. As the ratchet segment 71 is turned clockwise by the pawl 91, a crank 68 exerts a downward pressure on link 67 and thus on pressure bar 61 so that a predetermined compressive force is applied by the pressure bar 61 on the first strip 21. By reason of the shape of slot 88, when pin 92 enters the middle of slot 88 link 93 moves clockwise and pawl 91 becomes practically aligned therewith. Therefore the upward pressure exerted on pressure bar 61 by reason of the compression of papers 28 below bar 61 does not return the parts to initial position. As best shown in FIGS. 4 and 7, when the pawl 91 is exerting turning force on segment 71 pins 92, 94 and pawl 91 are almost in a straight line. Pin 92 bears against the top edge of the middle of slot 88 and segment 71 is locked in place. Slot 88 is long enough to permit full forward movement of handle 48.

Spring 96 functions as an overload mechanism, retaining fitting 98 and pivot pin 94 in a fixed position until such time as the resistance of compressed strips 21 and 24 with interposed paper 28 forces spring 96 to begin to compress, allowing fitting 98 and pin 94 to move within aperture 99 in plate 52, preventing overcompression of the bound book or damage to the machine. It also functions to ensure a predetermined pressure being applied to the book while it is being made. Spring 96 also accommodates variations in operator technique of inserting strips and lowering the pressure bar 61. Still further, the spring 96 accommodates different kinds of paper which may be used and particularly the effect of air between the sheets, which varies with different types of paper. When the binding operation is completed, handle 48 is returned to rearward position and this returns the link 81 to its forward position shown in FIG. 3. The pressure bar 61 may be raised manually because return of link 81 to forward position disengages the pawl 91 from the ratchet segmentt 71.

As shown in FIGS. 3 and 8–10, there is a lobe 101 on crank 79 which fits into an enlarged opening 102 in plate 52.

Mounted for horizontal reciprocation between side plate 52 and below the level of platen 54 is horizontal transverse knife support 106, the ends of which are connected to drive plates 107 which reciprocate immediately within plates 52. Horizontally elongated slot 108 is formed in plate 107 for passage of shaft 69 so that plate 107 and support 106 may reciprocate above the level of shaft 69. Further, horizontally elongated slot 110 is formed in plate 107 to receive enlarged head rivet 114 (see FIG. 8) fixed to plate 52 so as to retain plate 107 in close sliding contact with plate 52. Plate 107 is also formed with a slot having a surface 109 which is non-circular relative to shaft 69. The lobe 101 projecting through plate 52 fits into the opening in plate 107 and at the upper end of its movement (when the handle 48 is in retracted position), bears against surface 109 to prevent movement of plate 107 when handle 48 is up. Lobe 101 also functions when handle 48 is returned to retracted position to return plate 107 to initial position by moving plate 107 and support 106 to the left as viewed in FIG.

8. When the handle 48 is in forward position, the lobe 101 moves downwardly out of contact with the surface 109. (See dotted line position in FIG. 10). Horizontal tension springs 111 are fastened at their rear to a rear stationary anchor 112 interconnecting opposite plates 52 and at their forward ends are fastened to an ear 113 attached to plate 107. Hence the plates 107 are biased rearwardly by spring 111 from the knife retracted position shown in FIG. 8 to cutting position and this movement is permitted when the lobe 101 is in down position. When the handle is returned from forward position to retracted position, the lobe 101 engages the surface 109 as the handle approaches retracted position and moves the plate 107 and hence the knife support 106 to the left as viewed in FIG. 8.

Figure 12:
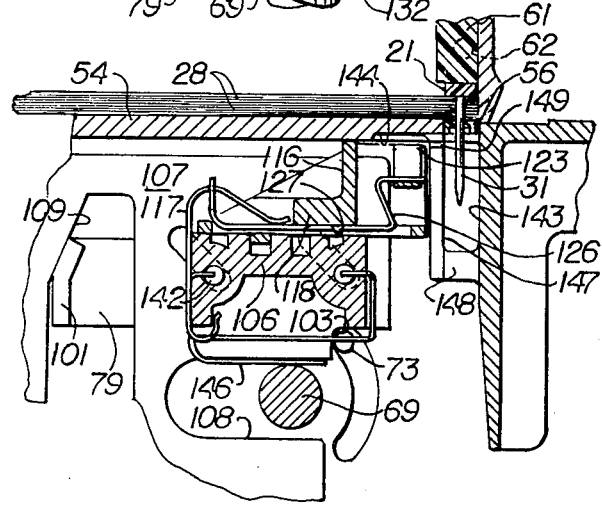
FIG. 12 is a sectional view taken substantially along the line 12—12 of FIG. 9 at the beginning of the binding cycle.
Figure 13:
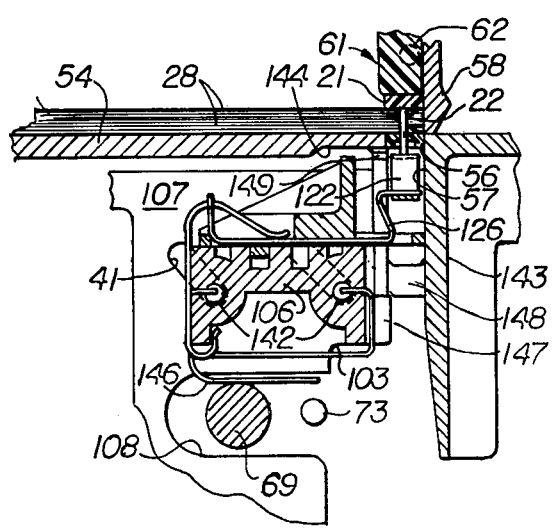
FIG. 13 is a view similar to FIG. 12 showing the knife at the end of the cutting operation.

Plate 107 at its right-hand end immediately above slot 108 is formed with a shoulder 103. When pin 73 is elevated (i.e., in the position shown in FIGS. 10 and 12), it engages shoulder 103 and prevents movement of plate 107 to the right. Hence, when the pressure bar 61 is elevated and pushed rearwardly (i.e., when there is no binding function to be performed), the pin 73 prevents movement of plate 107 despite the oscillation of crank 79 and the fact that lobe 101 is not in engagement with cam surface 109. As shown in FIG. 13, with the pin 73 out of engagement with shoulder 103 there is no obstacle to movement of the support 106 to the right so that the knife 122 may perform its cutting function.

Above knife support 106 is a removable knife support 116 which can be replaced when the knife hereinafter described has been damaged. The removable support 116 is connected to the support 106 by spring clips 117 which hold the two parts together as viewed in FIG. 12. By pulling the clips 117 in a counterclockwise direction, the upper right end of spring 117 is brought out of engagement with the horizontal portion 118 of support 116, permitting removal of support 116 and the parts assembled thereto.

Figure 9:
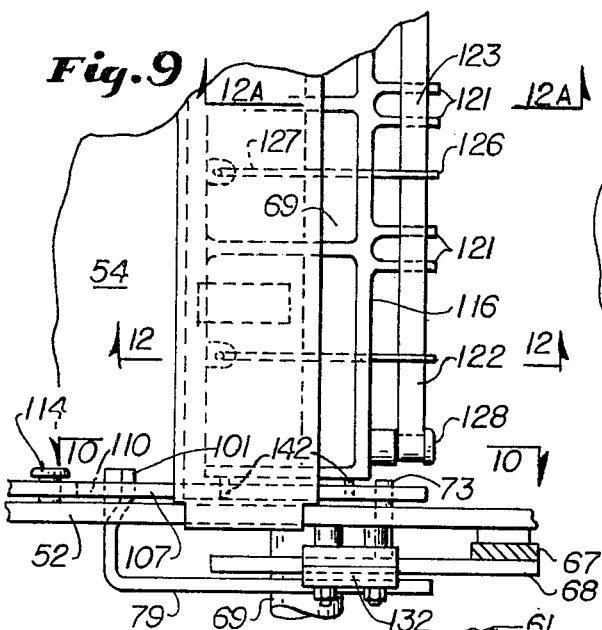
FIG. 9 is a partial plan view of the knife support mechanism of FIG. 8.
Figure 10:
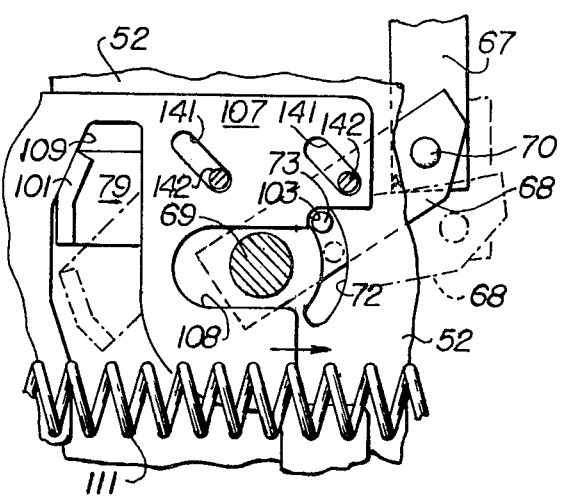
FIG. 10 is a sectional view taken substantially along the line 10—10 of FIG. 9.
Figure 11:
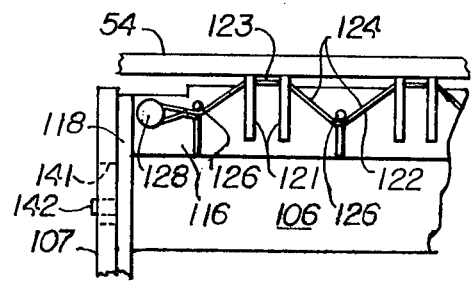
FIG. 11 is a fragmentary elevational view of a portion of the structure of FIG. 9 viewed from the right in FIG. 9.

Removable support 116, as best shown in FIGS. 9 and 11, at its rearward end has spaced vertical ribbon supports 121 which support knife 122. As has been mentioned, knife 122 is a continuous ribbon of spring steel preferably plated with a non-corrosive metal such as nickel then coated with Teflon so that the plastic stud 31 material does not cling thereto. A horizontal stretch 123 of ribbon 122 is tightly stretched between each pair of supports 121 and the spacing of horizontal stretches 123 coincides with the position of the stud material 31. Between horizontal stretches 123 and thus between the pairs of supports 121 the ribbon 122 slants downwardly in angular stretches 124 meeting at a point where they are engaged by hold-down springs 126 which are irregularly shaped members as best shown in FIG. 12 and slide in grooves 127 on the underside of portion 118 of removable support 116. Thus the springs 126 tension the ribbon 122 and cause the horizontal portions 123 to be stretched taut between the supports 121 so as to perform the cutting and heading function. The ends of ribbon 122 are bent around end posts 128 at opposite ends of support 116.

Figure 14:
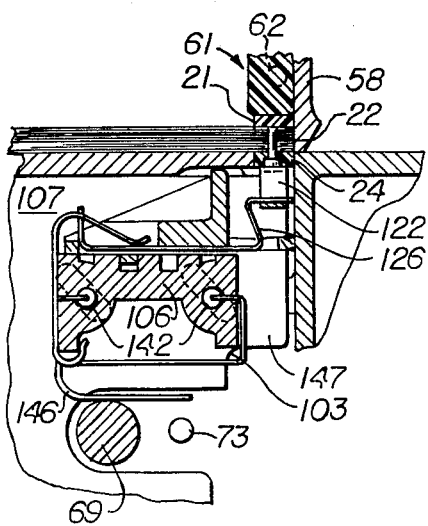
FIG. 14 is a view similar to FIG. 12 showing the knife at the end of the heading operation.
Figure 15:
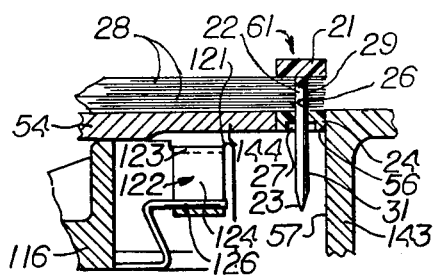
FIGS. 15-17 are views of the binding strip elements and associated machine structure at the positions in the cycle of operation corresponding to FIGS. 12-14, respectively.
Figure 12A:
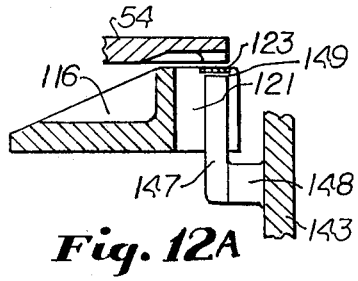
FIG. 12A is a fragmentary sectional view taken substantially along line 12A—12A of FIG. 9.
Figure 16:
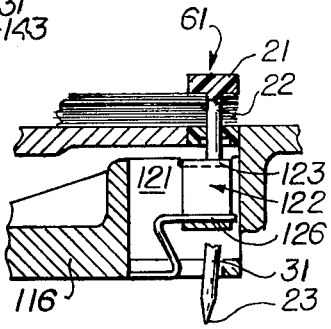

Drive plate 107 is provided with a pair of upwardly-rearwardly slanted slots 141. The opposite ends of support 106 are provided with a pair of pins 142 which fit into slots 141. When the support 106 has moved to the full right position (contrast FIGS. 12 with FIG. 13), it engages a stationary abutment 143 fixed to the frame of the machine. It will be noted that the underside of platen 54 is formed with an undercut 144, immediately to the left of recess 56. As springs 111 pull the support 106 to the right, when the support 106 engages abutment 143, further spring tension causes the pins 142 to move upwardly in the slots 141 until the position of FIG. 14 is attained. A spring 146 depending from support 106 and resiliently engaging the top of shaft 69 biases support 106 upwardly to the position of FIG. 14.

Integral with and depending from housing 54 and in horizontal alignment with the straight stretches 123 of knife 122 are vertical ribs 147 the lower ends of which are supported by supports 148 which are joined to abutment 143. The first time the knife is actuated, the hot horizontal stretches 123 cut horizontal slots 149 in ribs 147, the vertical height of said slots being about equal to the thickness of material of stretches 123. Thereafter, each time the hot knife is actuated it moves rearwardly through the slots 149 and when it retracts the margins of slots 149 wipe from the stretches 123 any plastic material which has adhered thereto when the studs 31 were cut.

Figure 19:
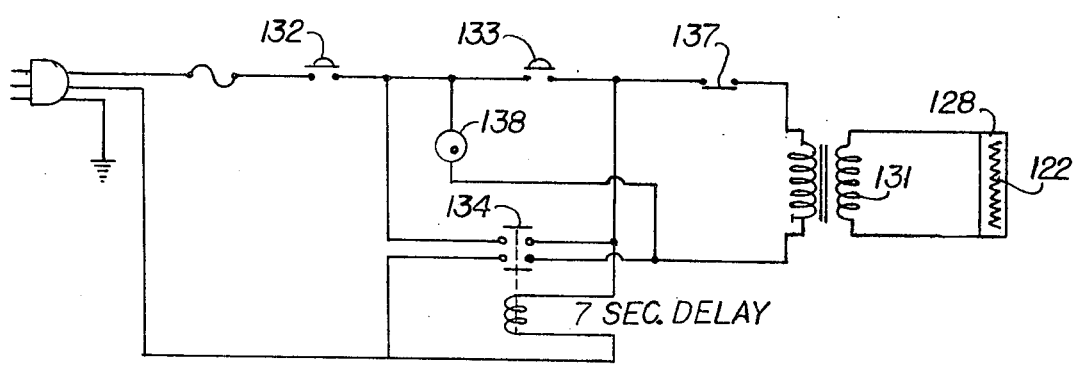
FIG. 19 is a schematic wiring diagram of the knife heating circuitry.

As shown in FIG. 19, the electrical system for control of the heating and cooling of the ribbon 122 is relatively simple. A transformer 131 is provided inside the casing 41. The secondary coil of the transformer 131 is connected to the opposite ends of the ribbon 122 which is heated by resistance when current passes through transformer 131. The circuitry which controls energization of the primary coil of transformer 131 is relatively simple as is shown in FIG. 19. When pressure bar 61 is moved from the position of FIG. 5 to FIG. 6, switch 132 is closed. When support 106 moves rearwardly from the position of FIG. 12 toward FIG. 13, switch 133 is closed and this energizes the coil of relay 134 and heats knife 122. Relay 134 has a pair of contacts which are held closed for an approximately seven second delay. Signal light 138 is energized during the timed second delay; and when the relay contacts open after the timed delay, the lamp 138 is de-energized notifying the operator that it is proper to replace the handle 48 from forward position to retracted position. Meanwhile, when support 106 has reached the position of FIG. 13, switch 137 is opened, de-energizing the primary coil of transformer 131 and allowing knife 122 to begin to cool. At the end of the timed delay, knife 122 has cooled sufficiently to cool the heads 32 as shown in FIG. 14.

BINDING OPERATION

The binding function of the apparatus is as follows:
The operator, with the handle 48 in upward-rearward position shown in FIG. 3, manually inserts the strip 24 in recess 56. A plurality of sheets 28, suitably formed with holes 29, is placed over the strip 24, one edge of the sheets being in contact with stop 47 and another with stop 58. Thereupon, the studs 22 of strip 21 are inserted through the holes 29 in sheets 28 and through the holes 26 in strip 24. The position of the parts is then substantially as in FIG. 15. Thereupon, the operator pulls pressure bar 61 forwardly and downwardly from the position of FIG. 5 to the position of FIG. 6 so that the pressure bar rests upon the top of strip 21 and partially compresses the sheets 28. This closes switch 132 and segment 71 moves to the position of FIG. 6.

Thereupon, the handle 48 is pulled forwardly, causing the link 81 to move rearwardly from the position of FIG. 3 to the position of FIG. 4. The sliding motion of pin 92 in the initial upward-rearwardly slanted portion of slot 88 causes the pawl 91 to engage one of the teeth of ratchet segment 71. Further movement of the handle 48 causes the pawl 91 to push ratchet segment 71 in a further clockwise rotation to move from the dot-and-dash position of FIG. 6 to the position of FIG. 7 until the spring 96 compresses as a result of a predetermined pressure of the pressure bar 61 on the stack of sheets 28. The movement of segment 71 in a clockwise direction, as viewed in FIG. 7, causes the crank arm 68 to move in a clockwise direction, pulling the link 67 and the pressure bar 61 downwardly, applying a force on the plastic strips 21 and the sheets 28 underneath the same. Oscillation of arm 68 oscillates shaft 69, and thus the downward force on each end of pressure bar 61 is equalized. As crank arm 68 moves to the position of FIG. 7, pin 73 moves out of contact with shoulder 103. Simultaneously, lobe 101 moves out of the contact with the cam surface 109. Thereupon, springs 111 pull the drive plate 107 to the rear right (as viewed in FIGS. 7 and 9-12). As soon as the plate 107 begins to move to the right, switch 133 is closed. Since the switch 137 is normally closed, the transformer 131 is energized, heating the ribbon 122. The relay 134 is closed for approximately seven seconds and lamp 138 is illuminated for such period.

As ribbon 122 moves from the position of FIG. 12 to the position of FIG. 13, the straight ribbon sections 123 cut off the excess stud material 31, leaving stubs of stud material 22 below the level of second strip 24. When the support 116 engages abutment 143, switch 137 is opened, causing ribbon 122 to begin to cool. Continued force of springs 111 causes the pins 142 to rise in the slots 141 and the ribbon 122 moves to the position of FIG. 14, filling counterbore 27 in second strip 24 with plastic material. During the timed delay of relay 134, the cool ribbon draws heat out of the stub material forming a solid head 32 filling the counterbore 27 and hardening the same.

Figure 18:
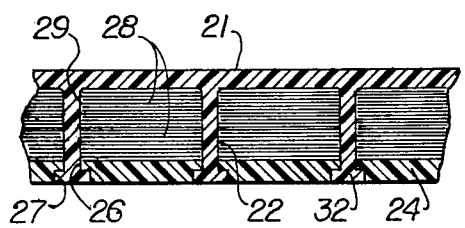
FIG. 18 is a fragmentary sectional view through the completed book along line 18—18 of FIG. 17.
Figure 17:
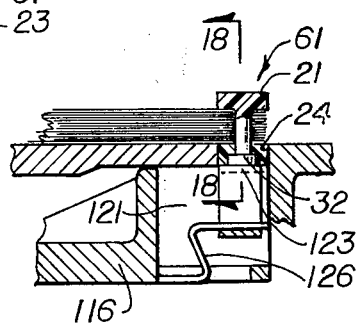

When the light 138 is extinguished after the timed delay, the operator moves the handle 48 to rearward position. This causes the link 81 to move from the position of FIG. 4 to the position of FIG. 3 so that the pin 92 rises to the upper end of slot 88. This causes segment 71 to return to the position of FIG. 6. Lobe 101 contacts surface 109, returning support 106 to the initial position of FIG. 12. As the knife 122 retracts, the margins of slots 149 wipe off any accumulation of plastic on the sections 123 of knife 122. Thereupon, the operator lifts bar 61 and moves it rearwardly to the position of FIG. 5. The completed book is then removed from the machine. As shown in FIG. 18, heads 32 fill counterbores 27, binding sheets 28 tightly between strips 21, 24 with studs 22 through the holes 29 in sheets 28.

PUNCH MECHANISM

Figure 20:
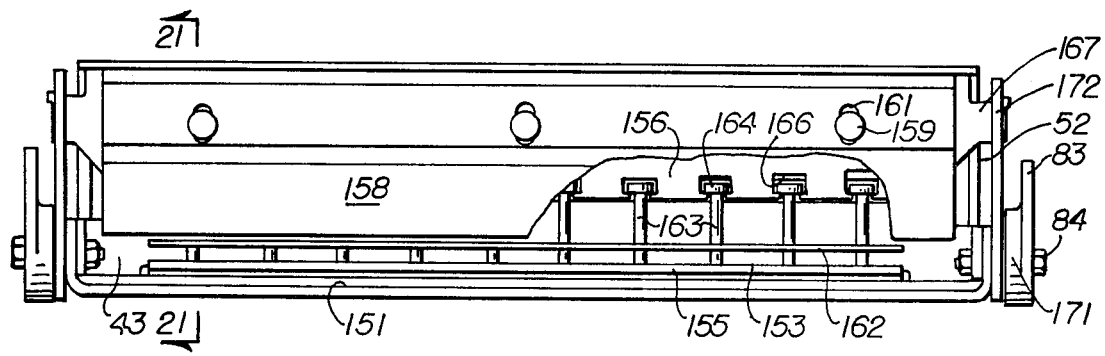
FIG. 20 is a front elevational view of the punch as viewed substantially along the line 20—20 of FIG. 2, partially broken away to show additional structure.

In a preceding portion of this Specification it has been explained that forward movement of handle 48 from the dotted line position of FIG. 3 to the position of FIG. 4 causes oscillation of the punch crank 83 from the position of FIG. 3 to the position of FIG. 4. Immediately below the level of punch opening 43 in the front 42 of casing 41 and spaced rearwardly at a point behind edge guide 46 is a female die plate 151 extending horizontally transversely of the machine, the upward turned outer ends of plate 151 being secured to side plates 52 by pivot bolts 84, as best shown in FIG. 20. Holes 152 are formed in plate 151, the number and location thereof depending upon the holes to be punched in the paper. The rearward edge of plate 151 is bent vertically upwardly in a stretch 160 which serves as a stop, limiting inward insertion of sheets 28. The distance between stop 160 and holes 152 determined the distance from the marginal edge of the sheets 28 at which the holes 29 are punched.

Immediately above plate 151 is a horizontal transverse guide plate 153 and there is a gap 155 between plates 151 and 153 which limits the quantity of paper which may be punched at one time. Plate 153 is formed with holes 154 which are vertically aligned with holes 152.

Vertically reciprocating punch plate 156 is in vertical alignment with holes 152 and 154 and is spaced forwardly from the upturned rear edges of plates 151 and 154 and spaced forwardly therefrom by spacer 157. Immediately in front of plate 156 is a front plate 158. Pins 159 pass through holes in the upturned edges of plates 151, 154 and through front plate 158 and also through spacer 157. The pins 159 pass through vertically elongated slots 161 in plate 156 so that the plate 156 may reciprocate relative to the stationary elements of the apparatus. An L-shaped secondary guide 162 is fixed to the front face of the vertically upturned portion of plate 153 and is also apertured in alignment with apertures 152, 154.

Figure 22:
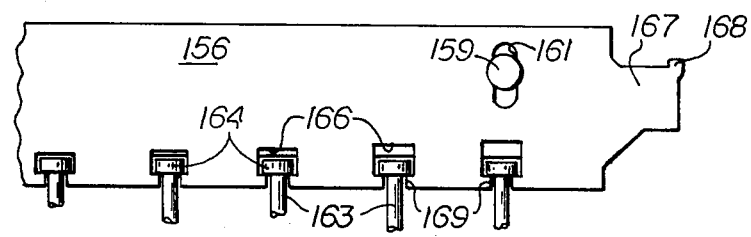
FIG. 22 is a fragmentary elevational view taken substantially along the line 22—22 of FIG. 21.

Male punches 163 which are in the form of round cross section pins are in vertical alignment with holes 152, 154. The lower ends of pins 163 are ground concave so as to cooperate with holes 152 to punch paper in the gap 155. The upper end of each pin 163 is formed with an enlarged head 164 which is received in a slot 166 in punch plate 156. As best shown in FIG. 22, at the left or center of the plate 156 the upward extent of slot 166 is slightly more than the thickness of head 164 but progressing either direction from the center the upward extension of slots 166 increases to a maximum on each end. Below slots 166 are inward extending shoulders 169 formed integral in plate 156, which engage under the heads 164. Thus as the plate 156 is depressed, each head 164 of pins 163 serially proceeding from the center of the machine outward toward either side is depressed by the top of slot 166 engaging the top of head 164. In other words, all of the pins 163 are not depressed at once but they are depressed sequentially in pairs matched relative to the centerline of the machine. Hence the force required to punch the entire series of holes in the paper is reduced because all of the holes are not punched simultaneously.

Actuation of vertical reciprocation of punch plate 156 is accomplished by oscillation of punch crank 83. It will be noted that plate 156 has outward extensions 167 at either end which project through slots in plate 52 and have upward extended ears 168. On the inward side of crank 83 is an eccentric boss 171 and said boss 171 fits in a hole in the lower end of vertical lever 172. Lever 172 at its upper end is formed with a truncated segmental slot 173 as best shown in FIG. 3 through which the extension 167 protrudes.

OPERATION OF PUNCH

Figures 21, 25:
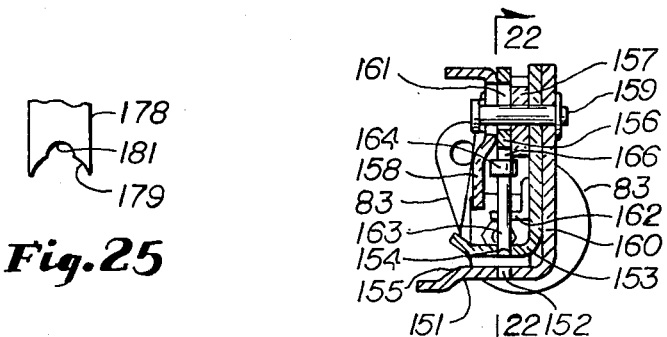
FIG. 21 is a fragmentary sectional view taken substantially along the line 21—21 of FIG. 20.
FIG. 25 is an enlarged fragmentary view of a portion of FIG. 23.

As the handle is moved from rearward position of FIG. 3 to the forward position of FIG. 4, crank 83 oscillates clockwise as viewed in FIGS. 3 and 4 and this causes eccentric boss 171 to pull plate 156 downward because extension 167 is depressed vertically by the downward movement of lever 72 with slot 173 against which extension 167 bears. Turning attention now to FIGS. 20-22, when the plate 156 is depressed, by reason of the top edge of each slot 166 contacting the top of head 164, the punches 163 are depressed sequentially proceeding from center to each end of plate 156. The depression of pins 163 causes the bottom end of the pin 163 to punch a hole in paper in gap 155 by reason of shearing action relative to holes 152. The holes in guide plate 153 and secondary guide 162 keep the pins 163 in vertical alignment with the holes 152 and 154. When the handle is returned to rearward position, the shoulders 169 pull the heads 164 of each of the pins 163 upwardly simultaneously permitting removal of the paper.

MODIFIED PUNCH

Figures 23, 24:
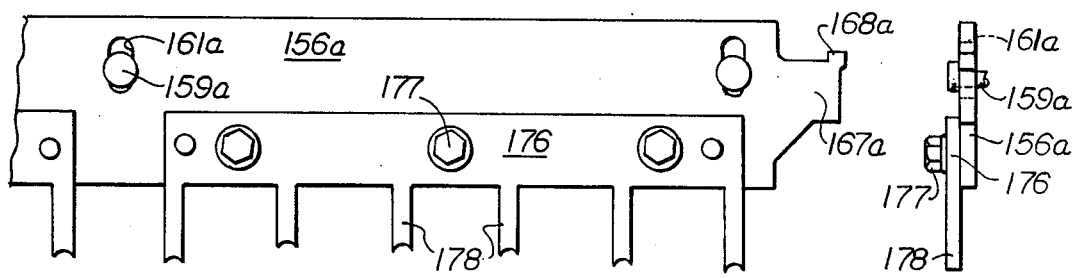
FIG. 23 is a fragmentary view similar to FIG. 22 of a modified punch construction.
FIG. 24 is an end elevational view of the structure of FIG. 23.

In FIGS. 23 and 24 is shown a modification of the punch heretofore described in which square or rectangular holes are formed in the paper rather than the round holes of the preceding modification. A punch body 176 which consists of an integral piece of metal is bolted to punch plate 156a by means of bolts 177. Depending from plate 176 is a series of male punch projections 178 which are rectangular or square in cross section and are ground at their lower ends in a manner similar to the grinding of pins 163 so that the male punch elements 178 will cooperate with the holes 152 (which are square or rectangular rather than round in the modified form of the punch) to punch square or rectangular holes in the paper.

The structure of FIGS. 23 and 24 resembles that of preceding modification and is incorporated in similar reciprocating structure. Corresponding elements are designated with the same reference numerals as in the preceding modification followed by subscript a.

A unique feature of the structure of the punch of FIGS. 23 and 24 is that the body 176 and integral projections 178 are a unitary piece of metal and can be stamped from a piece of sheet steel or other material in a single stamping operation, thereby eliminating the necessity of individual pins 163 as in the preceding modification and in conventional punches. As shown in FIG. 23, the lower ends of the projections 178 are not uniform but are of varying lengths so that the holes are punched in the paper sequentially rather than simultaneously proceeding from the center of the machine outwardly.

As best shown in FIG. 25, a preferred shape of distal end of projection 178 is shown. The bottom edge at each end curves upwardly-inwardly in stretches 179 and at the middle is a semi-circular edge 181. The radius of curvature of stretch 181 is substantially less than that of stretches 179. Particularly when punching extremely large thicknesses of paper, the curved portion 181 curls up the rectangular cutouts of the paper so that they are more easily driven through the holes 29 on the downstroke of the punch.

We claim:

1. Cutting means for use with a plurality of thermoplastic members comprising locating means for said members, a knife formed of a thin narrow ribbon of metal, electrical means for heating said knife by resistance, a support for said knife, a frame, guide means on said frame for guiding movement of said support from a first position remote from said members to a second position at which said knife cuts through said members, and support actuating means to move said support from first position to a second position and back to first position, said electrical means having a first switch to pass current through said knife as said support leaves first position and a second switch to cut off current to said knife when said support has heated said knife sufficiently to cut said members as said support reaches second position, said guide means having a third position in a direction relative to said second position at a right angle to the direction of movement of said support from first to second position whereby said knife first forms heads on stubs of cut material of said members and then cools said heads.

2. Cutting means for use with a plurality of thermoplastic members comprising locating means for said members, a knife formed of a thin narrow ribbon of metal, electrical means for heating said knife by resistance, a support for said knife, a frame, guide means on said frame for guiding movement of said support from a first position remote from said members to a second position at which said knife cuts through said members, support actuating means to move said support from first position to a second position and back to first position, said ribbon being bent in straight stretches and angular stretches intermediate said straight stretches and said support having projections across which said straight stretches lie, and resilient means on said support bearing against said ribbon at said angular stretches to draw said straight stretches taut.

3. Cutting means according to claim 2 which further comprises a plurality of substantially vertical ribs fixed relative to said locating means positioned in the path of movement of said straight stretches and each formed with a horizontal slot whereby as said knife moves between first and second positions said straight stretches pass through said horizontal slots and on the return of said knife to first position plastic material is wiped off said straight stretches by the margins of said slots.

4. Cutting means for use with a plurality of thermoplastic members comprising locating means for said members, a knife formed of a thin narrow ribbon of metal, electrical means for heating said knife by resistance, a support for said knife, a frame, guide means on said frame for guiding movement of said support from a first position remote from said members to a second position at which said knife cuts through said members. support actuating means to move said support from first position to a second position and back to first position, compression means applying a force tending to move said members in a direction along their axes, and an interlock between said compression means and said support means restraining movement of said support means from first position except when said compression means is actuated.

5. Cutting means according to claim 4 in which said electrical means comprises a third switch, said third switch being closed only when said compression means is actuated, said third switch when open cutting off current to said knife so that said knife is heated only when said compression means is actuated.

6. Cutting means according to claim 4 in which said actuating means comprises a spring to pull said support from first to second position and a handle to return said support to first position and to stress said spring.

* * * * *